United States Patent [19]

Haws et al.

[11] 3,858,657

[45] Jan. 7, 1975

[54] WELL STIMULATION WITH POLYAMINE SOLUTIONS

[75] Inventors: Gerald W. Haws, Denver; Bruce L. Knight; John S. Rhudy, both of Littleton, all of Colo.

[73] Assignee: Marathon Oil Company, Findlay, Ohio

[22] Filed: Nov. 26, 1973

[21] Appl. No.: 419,020

Related U.S. Application Data

[63] Continuation-in-part of Ser. No. 208,460, Dec. 15, 1971, abandoned.

[52] U.S. Cl. ............ 166/305 R, 166/274, 166/312
[51] Int. Cl. ................... E21b 43/16, E21b 43/25
[58] Field of Search ........ 166/273, 274, 275, 305 R, 166/312; 252/8.55 B

[56] References Cited
UNITED STATES PATENTS

| | | | |
|---|---|---|---|
| 3,511,313 | 5/1970 | Eilers et al. | 260/32.6 |
| 3,533,470 | 10/1970 | Marsh et al. | 166/312 |
| 3,556,221 | 1/1971 | Haws et al. | 166/305 R |
| 3,581,823 | 6/1971 | Feverbacher | 166/274 |
| 3,624,018 | 11/1971 | Eilers et al. | 260/32.6 N |
| 3,645,896 | 2/1972 | Larsen | 166/275 |
| 3,656,551 | 4/1972 | Biles | 252/8.55 B |

OTHER PUBLICATIONS

"Condensed Chemical Dictionary", Eighth Edition, 1971, p. 451.

*Primary Examiner*—Frank L. Abbott
*Assistant Examiner*—Jack E. Ebel
*Attorney, Agent, or Firm*—Joseph C. Herring; Richard C. Willson, Jr.; Jack L. Hummel

[57] ABSTRACT

Polyacrylamide and its derivatives are removed from a subterranean formation by flooding the formation with an aqueous polyamine solution. Skin damage can also be removed by this process, resulting in an improved injectivity index. The polyamine solution is preferably lower mono and dialkyl diamines, and more preferably is hydrazine.

14 Claims, No Drawings

WELL STIMULATION WITH POLYAMINE SOLUTIONS

CROSS REFERENCE TO RELATED APPLICATIONS

This is a continuation-in-part of our copending application Ser. No. 208,460, filed Dec. 15, 1971 and now abandoned.

BACKGROUND OF THE INVENTION

1. Field of the Invention

This invention relates to a method of stimulating injection wells. Particularly, it relates to a method of improving the flow characteristics of formations which have previously been flooded with polyacrylamide solutions.

2. Description of the Prior Art

U.S. 3,556,221 to Haws et al. teaches the injection of an aqueous sodium hypochlorite solution to remove polymer deposits in the vicinity of a wellbore.

U.S. 3,482,636 to Crowe teaches the injection of an aqueous solution comprising a hypohalite and an alkali metal hydroxide to increase the permeability of a reservoir plugged by various organic substances, including synthetic polymers.

U.S. 3,482,635 to Pasini teaches polyacrylamide removal from porous media by injecting alkali solutions consisting of mono and divalent metal salts. These solutions are often injected in the form of an alkaline brine.

U.S. 3,511,313 to Eilers teaches preparing and using cementitious formulations of soluble organic polymers, e.g. polyacrylamide, and organo solvents to solvate or plasticize the polymers. Certain amines are useful as the solvents, e.g. ethylene diamine, diethanol amine, monoethanol amine, diethylenetriamine, and triethanolamine. Eiler's solvents may be mixed with up to 25 percent water. Applicants' concentration of polyamine is up to a maximum of 3 percent, thus at least 97% water is present.

SUMMARY OF THE INVENTION

Applicants have discovered that the injectivity index of subterranean formations containing various polyacrylamides and/or skin damage, e.g. caused by bacteria, is significantly improved by injecting into the formation dilute solutions containing water-soluble polyamines. The preferred polyamines are the water-soluble lower alkyl diamines; hydrazine is the most preferred.

DESCRIPTION OF THE INVENTION

Injectivity index as used herein is defined as the ratio of injection rate in barrels per day to the excess pressure above reservoir pressure which causes the injection rate. It can be defined by the formula:

Injectivity index $= q + p_w - p_e$) BPD/psi wherein $p_w$ is the sand-face pressure in psi, $p_e$ is the reservoir static pressure measured at a point about equidistant between the injection and producing wells in psi, and $q$ is the injection rate in BPD.

The entrapped polymers with which this invention is particularly useful include polyacrylamides, partially hydrolyzed derivatives thereof, copolymers of polyacrylamides, and like polymers. Skin damage can also be removed by this invention. It is postulated that the polyamine chemically degrades the polymer, to increase the permeability of the formation.

Polyamines particularly useful with this invention include diamines and triamines. More preferably, these polyamines are water soluble; however, they can have limited water solubility. Examples of diamines include mono and dialkyl derivatives of diamines represented by the formula $N_2H_2RR'$ wherein R contains about one to 6 carbon atoms and R' contains zero to about 6 carbon atoms. Examples of triamines include quanidine and 1,3,5-triaminobenzene. Hydrazine is the most preferred polyamine.

The polyamine is present is concentrations of about 100 ppm to about 30,000 ppm; preferably about 500 ppm to about 15,000 ppm; and more preferably about 1,000 ppm to about 5,000 ppm. At concentrations of 40,000 ppm or higher, the polyamine solutions has an opposite effect on the injectivity index, i.e. it is reduced rather than increased. Solubility of the particular polyamine in water influences the upper concentration level. The amount of polyamine solution injected into the formation depends upon the amount and degree of the skin damage and/or the amount of entrapped polymer within the formation rock. Usually about one to about 500 barrels of the polyamine solution per vertical foot of the formation to be treated is sufficient.

Optionally, a drive medium can be injected behind the polyamine solution to displace the polyamine solution out into the formation. These fluids can be recovered at a production means and circulated back into the injection means. Preferably the drive medium is water.

EXAMPLE I

A Berea sandstone core (3 inches long by 1 inch in diameter) exhibits front and rear section water permeabilities of 213 md and 337 md, respectively. About 10 pore volumes of an aqueous solution containing 1,000 ppm of Pusher 700 polymer (Pusher is a trademark of Dow Chemical Co., Midland, Michigan, U.S.A. and identifies a partially hydrolyzed, high molecular weight polyacrylamide) are injected into the core, after which the core is flooded with water until stabilized (flushed) permeabilities of 6.85 and 23.5 md, respectively, are established. A 3 cc slug of water containing sufficient amounts of hydrazine to obtain a 14,000 ppm concentration in the core is injected into the core followed by water. The permeabilities are then measured and found to be 183 md in the front section of the core and 82.2 md in the rear section. This represents an 86 percent restoration of the original permeability to water in the front section of the core.

EXAMPLE II

A reservoir core plug with an original water permeability of 38.8 md in the rear section is flooded with about 10 pore volumes of an aqueous solution containing 500 ppm of Pusher 700 polymer and then flooded with water to a flushed permeability of 3.47 md. A 2 cc slug of water containing 1,000 ppm of methylhydrazine is injected, followed by fresh water. The permeability increases to 25.9 md, an increase of more than seven times that of the flushed permeability.

EXAMPLE III

A reservoir core plug having an original water permeability of 142 md in the front section and 145 md in the rear section is flooded with about 10 pore volumes of an aqueous solution containing 700 ppm of a partially hydrolyzed ultra-high molecular weight polyacrylamide and then measured and found to have permeabilities of 5.20 md for the front section and 5.42 md for the rear section. A 2 cc slug of water containing 1,000 ppm of ethylhydrazine is injected and followed with water. The resulting permeabilities are 52.5 md for the front section and 43.9 md for the rear section. This represents increases of 10.1-fold and 8.1-fold respectively, over the flushed values.

EXAMPLE IV

A reservoir core having an original water permeability of 42.1 md in the front section is flooded with about five pore volumes of an aqueous solution containing 700 ppm of Pusher 700 polymer and then flushed with water to a flushed permeability of 3.68 md. A 2 cc slug of water containing 1,000 ppm of dimethylhydrazine is injected followed by water. The permeability is increased to 35.3 md, an increase of 9.6-fold over the flushed value.

EXAMPLE V

For comparison, a reservoir core similar to that in Example III, having front and rear section water permeabilities of 132 md and 112 md, respectively, is flooded with about 10 pore volumes of an aqueous solution containing 700 ppm of an ultra-high molecular weight polymer, and then flooded with water. The core now has permeabilities of 3.11 md in the front section and 3.26 md in the rear section. It is flooded with a 2 cc slug of water containing 1,000 ppm of sodium hypochlorite solution. The permeabilities are then measured at 9.60 md for the front section and 6.75 md for the rear section, representing increases of 3.1-fold and 2.1-fold, respectively. Hence, the methylhydrazine of Example III proves to be three to four times more effective than sodium hypochlorite solution.

EXAMPLE VI

A 211 md Berea sandstone core plug is flooded with contaminated water (fresh water which has been exposed to the atmosphere for a period of 14 days to allow development of bacteria), causing the permeability in the core to be reduced to 59.4 md. A 3 cc slug of water containing 1,000 ppm of hydrazine is injected into the core, followed by water. The permeability increases to 86.4 md, an increase of 45%.

This specification will make obvious to those skilled in the art a number of modifications and variations of this invention, all of which are to be included in the scope of the invention as defined in the specification and appended claims.

What is claimed is:

1. A process for increasing the injectivity index of an injection means in fluid communication with an oil-bearing subterranean formation containing high molecular weight polyacrylamide(s) and/or derivatives(s) thereof in the immediate vicinity of the formation in fluid communication with the injection means, the process comprising contacting the formation with an aqeuous solution comprised of about 100 to about 30,000 ppm of polyamine and thereafter continuing normal operation of the injection means.

2. The process of claim 1 wherein about one barrel to about 500 barrels per vertical foot of the aqueous polyamine solution are injected into the formation.

3. The process of claim 2 wherein the concentration of the polyamine in the aqueous solution is about 500 to about 15,000 ppm.

4. The process of claim 1 wherein a drive medium is injected following the aqueous polyamine solution.

5. The process of claim 4 wherein the drive medium is water.

6. A process for increasing the injectivity index of an injection means in fluid communication with an oil-bearing subterranean formation containing a high molecular weight polyacrylamide(s) and/or derivatives(s) thereof in the vicinity of the injection means, the process comprising injecting into the formation an aqueous solution comprised of about 100 to about 30,000 ppm of a polyamine, the polyamine selected from the group consisting of lower mono and dialkyl derivatives of hydrazine.

7. The process of claim 6 wherein about one barrel to about 500 barrels per vertical foot of the polyamine solution are injected into the formation.

8. The process of claim 6 wherein the concentration of the polyamine in the aqueous solution is about 500 ppm to about 15.000 ppm.

9. The process of claim 6 wherein a drive medium is injected following the aqueous polaymine solution.

10. The process of claim 9 wherein the drive medium is water.

11. A process for increasing the injectivity index of an injection means in fluid communication with an oil-bearing subterranean formation containing a high molecular weight polyacrylamide(s) and/or derivatives(s) thereof in the vicinity of the injection means, the process comprising contacting the formation with an aqueous solution containing about 100 ppm to about 30,000 ppm of hydrazine, and thereafter continuing operation of the injection means.

12. The process of claim 11 wherein about one barrel to about 500 barrels of the hydrazine solution per vertical foot of formation are injected into the formation.

13. The process of claim 11 wherein the concentration of the hydrazine is about 500 ppm to about 15,000 ppm.

14. The process of claim 11 wherein water is injected following the aqueous hydrazine solution.

* * * * *